UNITED STATES PATENT OFFICE.

C. K. MARSHALL, OF NEW ORLEANS, LOUISIANA.

IMPROVED ARTICLE FOR FOOD FROM POTATOES.

Specification forming part of Letters Patent No. 77,995, dated May 19, 1868.

*To all whom it may concern:*

Be it known that I, C. K. MARSHALL, of New Orleans, in the parish of Orleans and State of Louisiana, have invented a certain new Article of Food and Commerce, made of sweet or other potatoes; and I do hereby declare that the following is a full, clear, and exact description of the same.

The nature of my invention consists in a simple and practical method of so preparing the yam, sweet and other potatoes, that they can be safely preserved for any length of time and in any latitude.

My invention is peculiarly applicable to the sweet-potato. It is well known that the sweet-potato is very perishable, and exceedingly liable to heat and rot. The sweet-potato can be raised in any quantity in most of the Southern States, especially in those States having the sandy or light soil; but, owing to the objections stated, the crop is of but little value except for home consumption. It is a vegetable unknown to the European market, and known only during certain seasons of the year even to our Northern market, where, as a vegetable, it commands the highest price, owing to its delicious flavor and the nutritious properties it possesses. This arises from the fact that this vegetable cannot, with safety, be transported.

It has long been considered a great desideratum to ascertain a method whereby the sweet-potato can be safely preserved, and at the same time retain its flavor and saccharine and other valuable properties. Years since, my attention was called to this subject, chiefly from the fact that we almost daily read accounts of persons dying at sea from that fearful scourge known as "scurvy" a disease that does not exist where fresh and healthy vegetables can be obtained. I made numerous inquiries, but could find no plan whereby vegetables could be shipped and used at sea that, when cooked, were as palatable and nutritious as those purchased in the market. Some time since I took a quantity of sweet potatoes, washed them, sliced them, and dried them precisely as fruits are dried. I have discovered that they can be preserved for any length of time, knowing those that have been prepared in accordance with my plan that have already been preserved for over eighteen months, and, when cooked, are as delightful to the palate as the potato just taken from the ground. This constitutes my process, the potatoes being preserved without steaming, cooking, or subjected to any other like process. The value of it is inestimable.

It is well known in the Southern States that from five hundred to one thousand bushels per acre is only an ordinary crop. The cost of preparation by my method is comparatively nothing, no machinery, no apparatus, nor anything of that nature being essential to its full and practicable development.

Having thus fully described my invention, what I claim therein as new, and desire to secure by Letters Patent of the United States, is—

As a new article of manufacture and commerce, a desiccated yam, sweet, or other potato, prepared substantially as described, and for the purpose specified.

In testimony whereof I have signed my name to this specification in the presence of two subscribing witnesses.

C. K. MARSHALL.

Witnesses:
 EDWIN JAMES,
 JOHN D. BLOOR.